US008159513B2

(12) United States Patent
Nishizawa (10) Patent No.: US 8,159,513 B2
(45) Date of Patent: Apr. 17, 2012

(54) IMAGE FORMING APPARATUS AND CONTROL METHOD FOR SAME (75) Inventor: Hideta Nishizawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1031 days.

(21) Appl. No.: 12/043,559

(22) Filed: Mar. 6, 2008

(65) Prior Publication Data
US 2008/0231683 A1 Sep. 25, 2008

(30) Foreign Application Priority Data

Mar. 19, 2007 (JP) ................. 2007-070493

(51) Int. Cl.
B41J 2/385 (2006.01)
(52) U.S. Cl. ..................... 347/132; 359/224.1
(58) Field of Classification Search .................. 347/132, 347/237, 250; 359/224.1; 369/44.28
See application file for complete search history.

(56) References Cited

U.S. PATENT DOCUMENTS

| 5,121,138 | A | * | 6/1992 | Schermer et al. | 347/250 |
| 5,247,384 | A | * | 9/1993 | Inoue et al. | 359/199.1 |
| 5,745,132 | A | * | 4/1998 | Hirabayashi et al. | 347/14 |
| 6,154,246 | A | * | 11/2000 | Ogasawara et al. | 347/250 |
| 6,515,781 | B2 | * | 2/2003 | Lewis et al. | 359/199.1 |
| 6,566,642 | B1 | * | 5/2003 | Yoshida | 250/208.1 |
| 6,956,597 | B2 | * | 10/2005 | Bush et al. | 347/243 |
| 2004/0119811 | A1 | * | 6/2004 | Bush et al. | 347/237 |
| 2004/0196518 | A1 | * | 10/2004 | Wine et al. | 359/197 |
| 2005/0024701 | A1 | * | 2/2005 | Cannon et al. | 359/204 |
| 2005/0185237 | A1 | * | 8/2005 | Nakajima | 359/212 |
| 2005/0243396 | A1 | * | 11/2005 | Fujii et al. | 359/224 |
| 2007/0058234 | A1 | * | 3/2007 | Oettinger et al. | 359/213 |
| 2007/0070483 | A1 | * | 3/2007 | Ishihara et al. | 359/213 |
| 2007/0146858 | A1 | * | 6/2007 | Matsuda | 359/224 |
| 2007/0162781 | A1 | * | 7/2007 | Visser et al. | 714/3 |
| 2008/0031102 | A1 | * | 2/2008 | Oettinger et al. | 369/44.28 |
| 2009/0097088 | A1 | * | 4/2009 | Nishizawa | 359/199.1 |
| 2009/0251756 | A1 | * | 10/2009 | Nishizawa | 359/223.1 |

FOREIGN PATENT DOCUMENTS

| JP | 9-104132 A2 | 4/1997 |
| JP | 9-230277 A1 | 9/1997 |
| JP | 2005-292627 A1 | 10/2005 |

* cited by examiner

Primary Examiner — Charlie Peng
Assistant Examiner — Peter Radkowski
(74) Attorney, Agent, or Firm — Fitzpatrick, Cella, Harper & Scinto (57) ABSTRACT An image forming apparatus includes a light beam generation unit, a light deflector having a resonance frequency and deflecting a light beam, a photosensitive member to which the deflected light beam is irradiated, and a driving control unit driving and controlling the light deflector. The driving control unit can measure a difference between a frequency of a light-deflector driving signal and the light-deflector resonance frequency and a non-drawing time during which an image is not formed by the light deflector. When the difference between the frequency of the driving signal and the light-deflector resonance frequency is equal to or larger than a predetermined value and the non-drawing time is equal to or longer than a predetermined time, the driving control unit produces the driving signal having a frequency corresponding to the resonance frequency of the light deflector and supplies the produced driving signal to the light deflector.

6 Claims, 6 Drawing Sheets

| SENSOR TEMPERATURE (°C) | RESONANCE FREQUENCY (kHz) |
|---|---|
| 20 | 1.99 |
| 21 | 2.00 |
| 22 | 2.01 |
| ... | ... |

IMAGE FORMING APPARATUS AND CONTROL METHOD FOR SAME

BACKGROUND OF THE INVENTION

1. Field of the Invention

The present invention relates to an image forming apparatus, such as a laser beam printer, which employs a light deflector having a microstructure, and also relates to a control method for the image forming apparatus.

2. Description of the Related Art

Hitherto, a rotatable multi-faceted mirror, e.g., a polygonal mirror, has been used as a light (beam) deflector in an image forming apparatus. As a technique to be substituted for the polygonal mirror, a light deflector has been recently proposed in which a mirror is driven at a resonance frequency to deflect a light beam. In comparison with a light scanning optical system which uses the rotatable multi-faceted mirror such as the polygonal mirror, the resonance-type light deflector is advantageous in that, for example, the deflector size can be greatly reduced and power consumption is small. Another advantageous feature of the resonance-type light deflector is that no face tangle exists theoretically. In particular, when a light deflector is manufactured using a single-crystal Si through a semiconductor process, the light deflector is theoretically free from metal fatigue and has superior durability.

Typically, the resonance-type light deflector includes a moving element, a torsion spring, and a support for supporting those elements. The resonance frequency of that light deflector is determined based on the inertial moment of the moving element and the spring constant of the torsion spring. Further, because the spring constant of the torsion spring depends on temperature, the resonance frequency of the light deflector is changed depending on the environmental temperature. Accordingly, when the resonance frequency of the light deflector is shifted as a result of temperature change, the frequency of a driving signal is required to be adjusted.

Japanese Patent Laid-Open No. 2005-292627 discloses a technique of detecting the oscillating position of a mirror in a light deflector and adjusting a driving signal for the light deflector based on the detected position information. More specifically, a light beam generated from a light beam generation unit is deflected for scanning by a deflecting mirror (light deflector) which can be driven by the driving signal, and a light sensor detects the timing at which the light beam passes a predetermined position. With the technique disclosed in Japanese Patent Laid-Open No. 2005-292627, the driving signal is adjusted based on the timing at which the light beam is received by the light sensor.

In the case using the above-described light deflector in an image forming apparatus, however, if the driving signal is adjusted during image formation, the driving signal for the light deflector is changed during printing, thus causing deterioration of printing accuracy.

A light beam generation unit and a photosensitive member can be controlled in conjunction with the operation of the light deflector so that the printing accuracy is not deteriorated even when the driving signal is adjusted during image formation. However, such a solution requires complicated control of the light deflector, the light beam, and the photosensitive member.

SUMMARY OF THE INVENTION

An embodiment of the present invention is directed to an image forming apparatus provided with a light deflector having a resonance frequency, in which a driving frequency of the light deflector can be changed by a simple method without causing deterioration of printing accuracy.

According to one aspect of the present invention, an image forming apparatus includes a light beam generation unit arranged to generate a light beam, a light deflector having a resonance frequency and arranged to deflect the light beam, a photosensitive member to which the deflected light beam is irradiated, and a driving control unit configured to drive and control the light deflector, wherein the driving control unit is able to measure a difference between a frequency of a driving signal to drive the light deflector and the resonance frequency of the light deflector and a non-drawing time during which an image is not formed by the light deflector, and when the difference between the frequency of the driving signal and the resonance frequency of the light deflector is equal to or larger than a predetermined value and when the non-drawing time is equal to or longer than a predetermined time, the driving control unit produces the driving signal having a frequency corresponding to the resonance frequency of the light deflector and supplies the produced driving signal to the light deflector.

According to another aspect of the present invention, the image forming apparatus including the light deflector having the resonance frequency is controlled by the following control method. The control method for the image forming apparatus includes the steps of measuring a difference between a frequency of a driving signal to drive the light deflector and the resonance frequency of the light deflector, measuring a non-drawing time during which an image is not formed by the light deflector, and when the difference between the frequency of the driving signal and the resonance frequency of the light deflector is equal to or larger than a predetermined value and when the non-drawing time is equal to or longer than a predetermined time, producing the driving signal having a frequency corresponding to the resonance frequency of the light deflector and supplying the produced driving signal to the light deflector.

According to the present invention, in the image forming apparatus including the resonance-type light deflector, the driving frequency of the light deflector can be changed by a simple method without causing deterioration of printing accuracy.

Further features of the present invention will become apparent from the following description of exemplary embodiments with reference to the attached drawings.

DESCRIPTION OF THE EMBODIMENTS

An exemplary embodiment of the present invention will be described below.

(Overall Construction of Apparatus)

Figure 1:
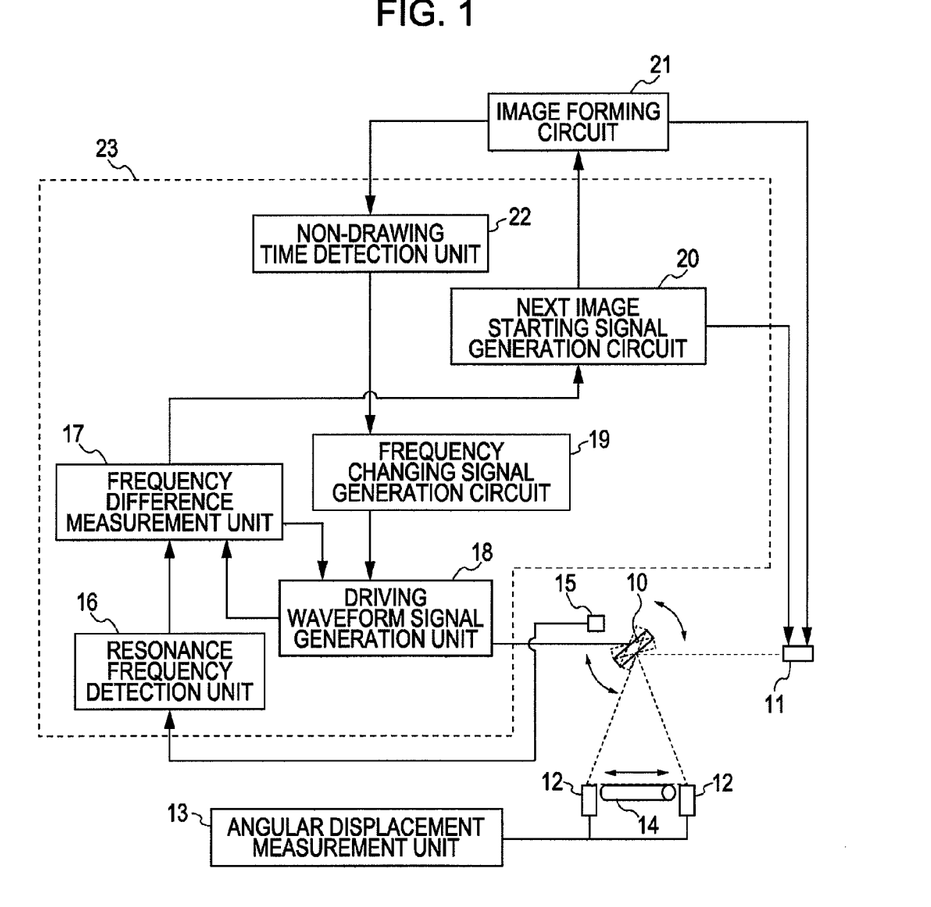
FIG. 1 is a block diagram of an image forming apparatus according to an exemplary embodiment of the present invention.

FIG. 1 illustrates an image forming apparatus according to the exemplary embodiment of the present invention.

The image forming apparatus according to the exemplary embodiment of the present invention includes a light beam generation unit 11 which generates a light beam, a light deflector 10 which has a resonance frequency and deflects the light beam, a photosensitive member 14 to which the deflected light beam is irradiated, and a driving control unit 23 which drives and controls the light deflector 10. In the exemplary embodiment, the driving control unit 23 includes a resonance frequency detection unit 16, a frequency difference measurement unit 17, a driving waveform signal generation unit 18, a frequency changing signal generation circuit 19, a next image starting signal generation circuit 20, and a non-drawing time detection unit 22.

The driving control unit 23 can measure the difference between the frequency of a driving signal to drive the light deflector 10 and the resonance frequency of the light deflector 10 and a non-drawing time during which an image is not formed by the light deflector 10. Further, when the difference between the frequency of the driving signal and the resonance frequency of the light deflector 10 is equal to or larger than a predetermined value and when the non-drawing time is equal to or longer than a predetermined time, the driving control unit 23 produces a driving signal having a frequency corresponding to the resonance frequency of the light deflector 10 and supplies the produced driving signal to the light deflector 10.

The image forming apparatus according to the exemplary embodiment will be described in more detail below.

In the image forming apparatus according to the exemplary embodiment, the light beam emitted from the light beam generation unit 11 is deflected by the light deflector 10 to be scanned in the direction of a longitudinal axis of the photosensitive member 14, i.e., in the direction of main scanning.

The driving waveform signal generation unit 18 generates a driving signal having the same frequency as the resonance frequency of the light deflector 10 and applies torque to the light deflector 10 for oscillating it.

The deflected light beam is scanned in the direction of main scanning for the photosensitive member 14, to thereby form an electrostatic latent image, which is requested for printing, on the photosensitive member 14. Then, the electrostatic latent image is developed by toner, and a toner image is transferred onto a sheet of paper in a transfer section (not shown). The transferred toner image is fused by the action of heat in a fuser (not shown) for fixing to the sheet of paper.

The amount of displacement (displacement angle) of the light deflector 10 can be measured by an angular displacement measurement unit 13 based on the timing at which the deflected light beam enters each of photo detectors 12 which are disposed on both sides of the photosensitive member 14.

The light beam generation unit 11 controls the light beam pixel by pixel in accordance with data supplied from an image forming circuit 21.

Further, the driving control unit 23 in the exemplary embodiment includes the resonance frequency detection unit 16 for detecting the resonance frequency of the light deflector 10, and the frequency difference measurement unit 17 for measuring the difference between the driving frequency of the driving signal and the resonance frequency detected by the resonance frequency detection unit 16.

In addition, the driving control unit 23 in the exemplary embodiment includes the non-drawing time detection unit 22 for detecting the time during which an image is not formed.

More specifically, the non-drawing time detection unit 22 detects the time during which the electrostatic latent image is not formed on the photosensitive member 14.

Also, the non-drawing time detection unit 22 can detect a time from the end of a period of time during which the electrostatic latent image for a preceding page is formed on the photosensitive member 14 to a point in time just before the electrostatic latent image for a succeeding page starts to be formed on the photosensitive member 14.

Further, the non-drawing time detection unit 22 can detect a time during which the electrostatic latent image is not formed on the photosensitive member 14 for a predetermined time or longer within an image forming period for a single page.

The above-mentioned time can be determined, for example, by referring to an image memory incorporated in the image forming circuit 21.

When the difference between the driving frequency and the resonance frequency of the light deflector 10, which has been measured by the frequency difference measurement unit 17, is equal to or larger than the predetermined value and when the non-drawing time detected by the non-drawing time detection unit 22 is equal to or longer than the predetermined time, the driving waveform signal generation unit 18 produces the driving signal corresponding to the resonance frequency after being changed. The produced driving signal is supplied to the light deflector 10.

Herein, the expression "when the difference between the driving frequency and the resonance frequency of the light deflector 10, which has been measured by the frequency difference measurement unit 17, is equal to or larger than the predetermined value" means the case that the difference between the driving frequency and the resonance frequency of the light deflector 10 is increased to such an extent as giving a difference causing deterioration of printing accuracy.

Also, the expression "when the non-drawing time is equal to or longer than the predetermined time" means the case that, when the driving signal for the light deflector 10 is changed, the non-drawing time exceeds a time required for the light deflector 10 to be driven by the driving signal after being changed.

(Light Deflector)

Figure 2A:
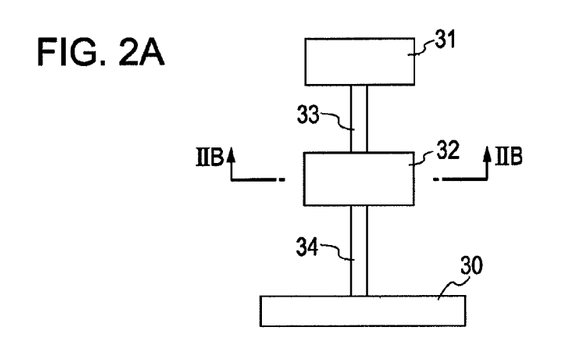
FIGS. 2A and 2B are schematic views of a light deflector used in the exemplary embodiment of the present invention.

FIG. 2A illustrates an example of the light deflector 10 used in the exemplary embodiment of the present invention. The illustrated light deflector 10 includes two (first and second) moving elements 31 and 32, two torsion springs 33 and 34, and a support 30. In the illustrated example, a light deflector having two different natural oscillation modes can be realized by coupling the two moving elements 31 and 32 to the support 30 through the two torsion springs 33 and 34 as shown. By driving such a light deflector with a combined wave of a plurality of sine waves, the light deflector capable of realizing scanning at a substantially constant speed can be obtained.

In the light deflector 10, a reflecting member made of, e.g., a metal thin film is coated on the first moving element 31, for example.

Figure 2B:
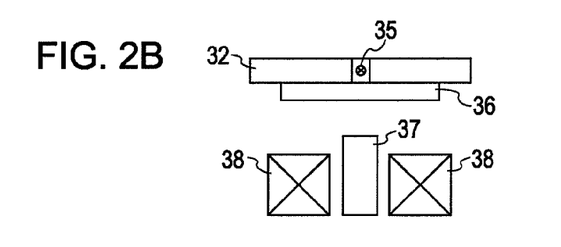

FIG. 2B is a sectional view taken along a line IIB-IIB in FIG. 2A. A magnet 36 is disposed on the second moving element 32, and a soft magnetic member 37 and coils 38 are disposed externally to apply a magnetic force to the magnet 36. When a driving current is supplied to the coils 38, the moving elements 31 and 32 can be driven to oscillate about an oscillation axis 35 serving as a center.

The resonance frequency of the light deflector 10 in the exemplary embodiment is determined based on respective inertial moments of the two moving elements 31 and 32 and respective spring constants of the two torsion springs 33 and 34. Because the spring constants of the two torsion springs 33 and 34 are changed with a change in temperature, the resonance frequency of the light deflector 10 is also changed depending on temperature.

The exemplary embodiment has been described above in connection with the light deflector including the two moving elements 31 and 32, the two torsion springs 33 and 34, and the support 30. However, the present invention is not limited to the illustrated light deflector and can also be applied to, for example, a light deflector in which one moving element is supported by one or two torsion springs.

(Resonance Frequency Detection Unit)

Figure 3:
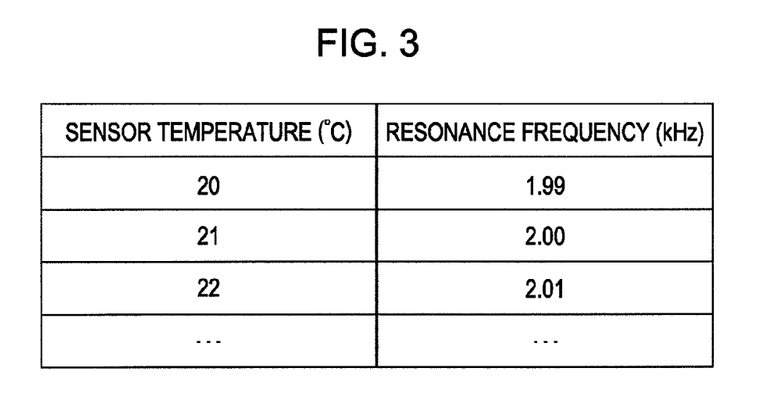
FIG. 3 is a table showing the relationship between the temperature and the resonance frequency of the light deflector.

A method of detecting the resonance frequency of the light deflector 10 will be described next. The resonance frequency of the light deflector 10 can be determined by installing a temperature sensor 15 near the light deflector 10, obtaining temperature data detected by the temperature sensor 15, and referring to a temperature versus resonance frequency table, shown in FIG. 3, which is previously stored in the resonance frequency detection unit 16.

Another method of measuring the resonance frequency includes, for example, the steps of stopping the driving signal for the light deflector 10 which is being driven, and calculating the resonance frequency from a value by which the oscillation amplitude of the light deflector 10 is reduced.

(Frequency Difference Measurement Unit)

Data regarding both the resonance frequency calculated by the resonance frequency detection unit 16 and the driving frequency produced by the driving waveform signal generation unit 18 are input into the frequency difference measurement unit 17.

The frequency difference measurement unit 17 calculates the difference between both the frequencies input thereto. When the calculated difference exceeds a value at which the driving frequency is required to be changed, the frequency difference measurement unit 17 outputs a frequency difference generation signal to the next image starting signal generation circuit 20. The value of the difference at which the frequency difference measurement unit 17 outputs the frequency difference generation signal can be arbitrarily set. In the exemplary embodiment, when the difference between the driving frequency and the resonance frequency of the light deflector 10 is increased to such an extent as giving a difference causing deterioration of printing accuracy, such a difference is selected as the setting value.

(Next Image Starting Signal Generation Circuit)

When the frequency difference measurement unit 17 outputs the frequency difference generation signal to the next image starting signal generation circuit 20, the next image starting signal generation circuit 20 does not output a next image starting signal to the image forming circuit 21 and the light beam generation unit 11, whereby the printing is stopped.

Conversely, when the next image starting signal generation circuit 20 outputs the next image starting signal to the image forming circuit 21 and the light beam generation unit 11, the image forming apparatus comes into a printing-enable state.

(Non-Drawing Time Detection Unit)

The non-drawing time detection unit 22 detects the non-drawing time and outputs a non-drawing time detection signal.

The term "non-drawing time" will be described in detail with reference to FIGS. 4A-4C. While FIGS. 4A-4C illustrate the state that an image printed on a sheet of paper, the following description is made based on the premise that an electrostatic latent image corresponding to the illustrated image is formed on the photosensitive member.

Figure 4A:
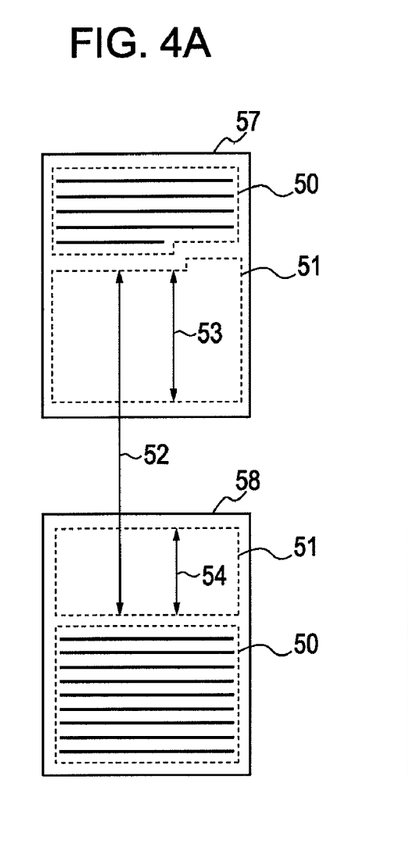
FIGS. 4A, 4B and 4C illustrate drawing areas and non-drawing areas.

FIG. 4A represents the state that a document is drawn in a drawing area 50 of each of a preceding page 57 and a succeeding page 58. As illustrated in the preceding page 57 of FIG. 4A, there is a continuous non-drawing area 51 (i.e., an area in which the electrostatic latent image is not formed on the photosensitive member) in a second half of the sheet when the document has been printed. Also, as illustrated in the succeeding page 58, there is a continuous non-drawing area 51 in a first half of the sheet when the document has been printed. When the non-drawing area exists in excess of a certain amount as illustrated in FIG. 4A, the non-drawing time detection unit 22 detects the non-drawing area by referring to the image memory incorporated in the image forming circuit 21 and outputs a non-drawing time detection signal. In the case of FIG. 4A, the non-drawing time detection signal can be output at the timing of each non-drawing time 52, 53 or 54.

Figure 4B:
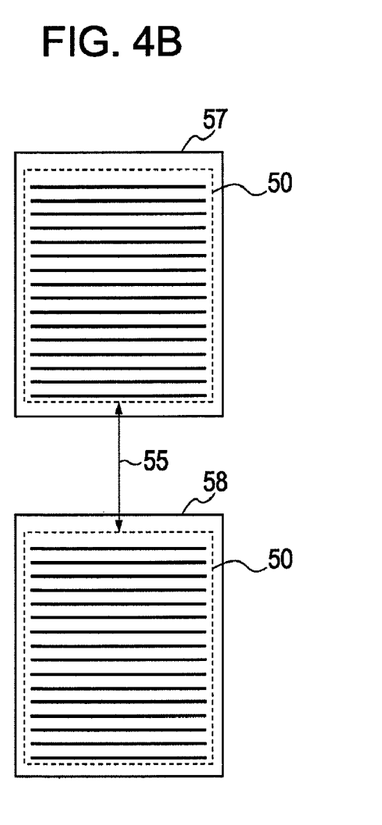

FIG. 4B represents the state that a document is drawn in a drawing area 50 of each of a preceding page 57 and a succeeding page 58. The case of FIG. 4B differs from the case of FIG. 4A in that the document is continuously drawn over both the preceding page 57 and the succeeding page 58. In the case of FIG. 4B, as in the case of FIG. 4A, the non-drawing time detection unit 22 detects a non-drawing area (i.e., an area in which the electrostatic latent image is not formed on the photosensitive member) by referring to the image memory incorporated in the image forming circuit 21 and outputs a non-drawing time detection signal. In the case of FIG. 4B, the non-drawing time detection signal is output at the timing of a non-drawing time 55. The non-drawing time 55 corresponds to a time from the end of a period of time during which the electrostatic latent image for the preceding page is formed on the photosensitive member to a point in time just before the electrostatic latent image for the succeeding page starts to be formed on the photosensitive member.

Figure 4C:
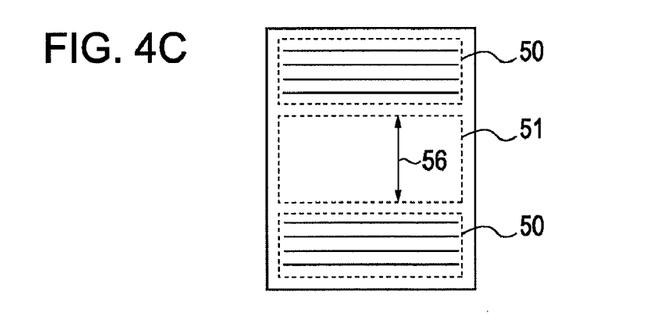

Further, when a certain amount of non-drawing area 51 (i.e., an area in which the electrostatic latent image is not formed on the photosensitive member) exists in a sheet of paper as illustrated in FIG. 4C, the non-drawing time detection unit 22 detects the non-drawing area by referring to the image memory incorporated in the image forming circuit 21 and outputs a non-drawing time detection signal. In this case, the non-drawing time detection signal is output at the timing of a non-drawing time 56. The non-drawing time 56 corresponds to a time during which the electrostatic latent image is not formed on the photosensitive member for a predetermined time or longer within the same one page.

The extent of the area that is determined as corresponding to the non-drawing time can be arbitrarily set. For example, the extent of the area can be set in consideration of a time required for correcting the driving frequency.

(Frequency Changing Signal Generation Circuit)

The frequency changing signal generation circuit 19 will be described next. When the non-drawing time detection unit 22 outputs the non-drawing time detection signal, the frequency changing signal generation circuit 19 outputs a frequency changing signal to the driving waveform signal generation unit 18.

(Driving Waveform Signal Generation Unit)

When the frequency changing signal generation circuit 19 outputs the frequency changing signal and when the frequency difference measurement unit 17 outputs the frequency difference generation signal, the driving waveform signal generation unit 18 changes the current driving frequency of the driving signal to the frequency detected by the resonance frequency detection unit 16.

(First Control Method for Driving Frequency)

A first control method for the driving frequency according to the exemplary embodiment of the present invention will be described with reference to FIG. 5. The first control method for the driving frequency represents a method of changing the driving frequency by using, e.g., the non-drawing time 55 between the preceding sheet and the succeeding sheet as illustrated in FIG. 4B.

Figure 5:
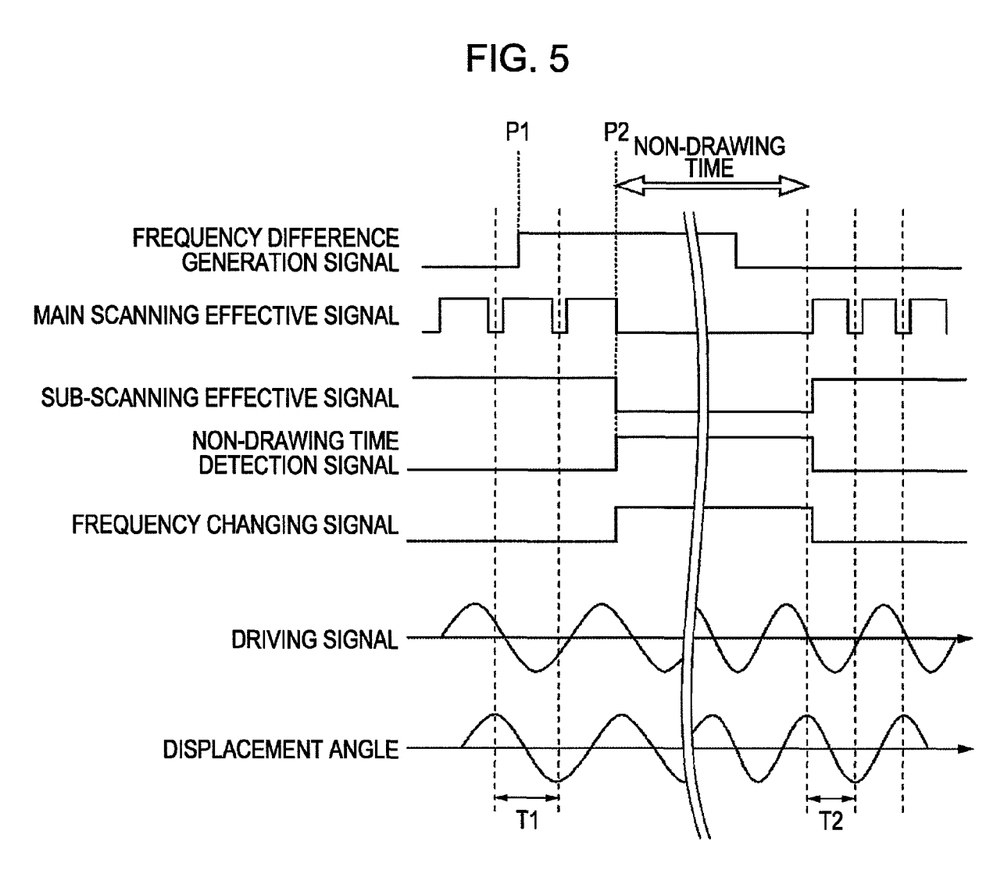
FIG. 5 is a timing chart illustrating the driving frequency change timing according to a first control method in the exemplary embodiment of the present invention.

In FIG. 5, the frequency difference generation signal is output from the frequency difference measurement unit 17 when the difference between the resonance frequency calculated by the resonance frequency detection unit 16 and the driving frequency generated by the driving waveform signal generation unit 18 exceeds the setting value. A main scanning effective signal is output at the timing at which the light deflector performs drawing on the photosensitive member in the direction of main scanning. A sub-scanning effective signal is output at the timing at which the light deflector performs scanning in the direction of sub-scanning. The non-drawing time detection signal is output when the non-drawing time detection unit 22 detects the non-drawing time. In the exemplary embodiment, the non-drawing time detection signal is output when the main scanning effective signal and the sub-scanning effective signal are both turned off.

The frequency changing signal is output from the frequency changing signal generation circuit 19. In the exemplary embodiment, the frequency changing signal is output at the timing at which the non-drawing time detection signal is output from the non-drawing time detection unit 22. The driving signal represents the driving waveform applied to the light deflector 10 from the driving waveform signal generation unit 18, and a displacement angle represents the change in the displacement angle of the light deflector 10 with respect to time.

When the resonance frequency of the light deflector 10 is changed with a change in temperature, the frequency difference generation signal indicating the generation of the difference between the resonance frequency and the driving frequency is turned on at timing P1 and is output to the driving waveform signal generation unit 18. At the timing P1, because the non-drawing time detection signal is turned off, the driving waveform signal generation unit 18 does not change the driving frequency.

Thereafter, the printing process is advanced and the sub-scanning effective signal is turned off at timing P2. At the timing P2, the non-drawing time detection unit 22 is turned on and the non-drawing time detection signal is output to the driving waveform signal generation unit 18. The timing at which the sub-scanning effective signal is turned off corresponds to, for example, the timing between the preceding sheet and the succeeding sheet as indicated by the non-drawing time 55 in FIG. 4B.

The driving waveform signal generation unit 18 executes the step of changing the driving frequency after detecting that the frequency difference generation signal is turned on and the frequency changing signal is turned on. When the step of changing the driving frequency is completed, the frequency difference generation signal is turned off. With the above-described control, the cycle (½ cycle in FIG. 5) of the displacement angle of the light deflector 10 can be changed from T1 to T2.

(Second Control Method for Driving Frequency)

A second control method for the driving frequency according to the exemplary embodiment of the present invention will be described with reference to FIG. 6. The second control method for the driving frequency represents a method of changing the driving frequency by using, e.g., the non-drawing time 52, 53, 54 or 56 generated in the drawing area of the sheet as illustrated in FIGS. 4A and 4C.

Figure 6:
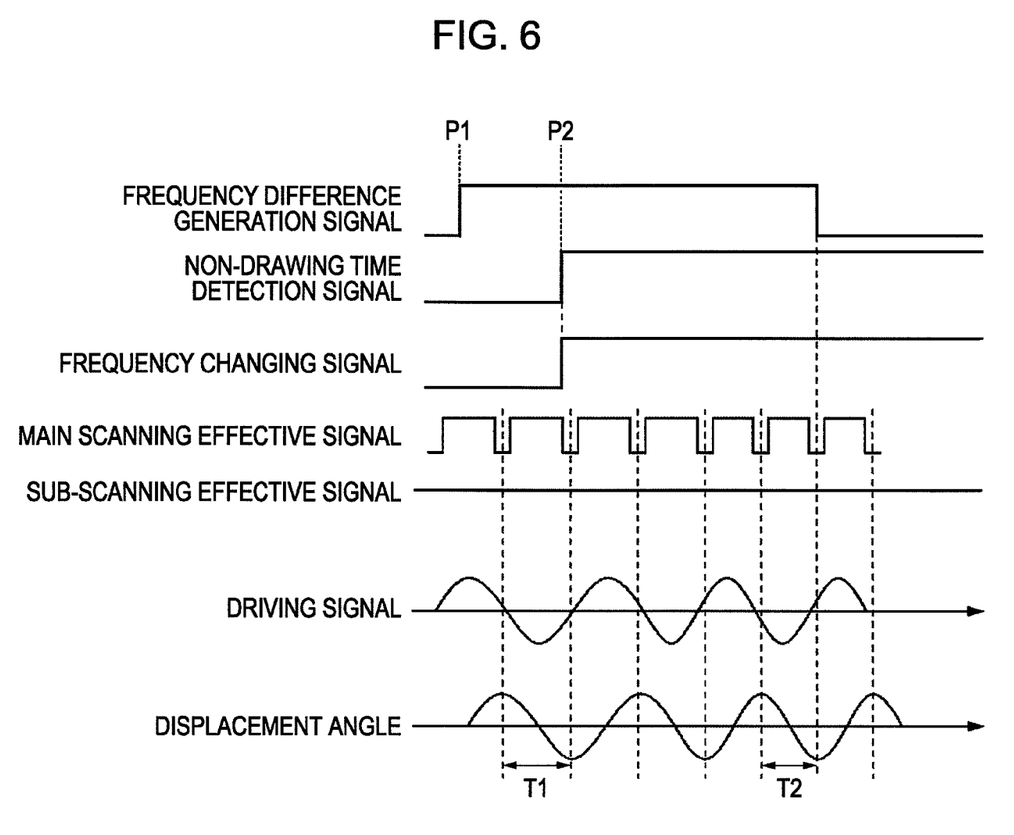
FIG. 6 is a timing chart illustrating the driving frequency change timing according to a second control method in the exemplary embodiment of the present invention.

In FIG. 6, the frequency difference generation signal, the main scanning effective signal, the sub-scanning effective signal, the driving signal, and the displacement angle are the same as those in FIG. 5. The non-drawing time detection signal is output when the non-drawing time detection unit 22 detects the non-drawing time.

The frequency changing signal is output from the frequency changing signal generation circuit 19. In the exemplary embodiment, the frequency changing signal is output at the timing at which the non-drawing time detection signal is output from the non-drawing time detection unit 22.

When the resonance frequency of the light deflector 10 is changed with change in temperature, the frequency difference generation signal indicating the generation of the difference between the resonance frequency and the driving frequency is turned on at timing P1 and is output to the driving waveform signal generation unit 18. At the timing P1, because the non-drawing time detection signal is turned off, the driving waveform signal generation unit 18 does not change the driving frequency.

Thereafter, when the printing process is further advanced and the non-drawing time detection unit 22 detects the non-drawing area, the non-drawing time detection unit 22 is turned on and the non-drawing time detection signal is output to the driving waveform signal generation unit 18 at timing P2. The timing at which the non-drawing time detection signal is output corresponds to, for example, the timing at which the non-drawing time 52, 53, 54 or 56 (i.e., a time during which the electrostatic latent image is not formed on the photosensitive member) is generated in the drawing area of the sheet as illustrated in FIGS. 4A and 4C. In this case, the non-drawing time detection signal is output even when the sub-scanning effective signal is turned on (although the sub-scanning effective signal is turned off in the non-drawing time 52 between the preceding sheet and the succeeding sheet).

The driving waveform signal generation unit 18 executes the step of changing the driving frequency after detecting that the frequency difference generation signal is turned on and the frequency changing signal is turned on. When the step of changing the driving frequency is completed, the frequency difference generation signal is turned off. With the above-described control, the cycle (½ cycle in FIG. 6) of the displacement angle of the light deflector 10 can be changed from T1 to T2.

(Delay of Printing Process)

A method of delaying the next printing process until a certain time after the driving frequency changing process will be described below with reference to FIG. 7.

Figure 7:
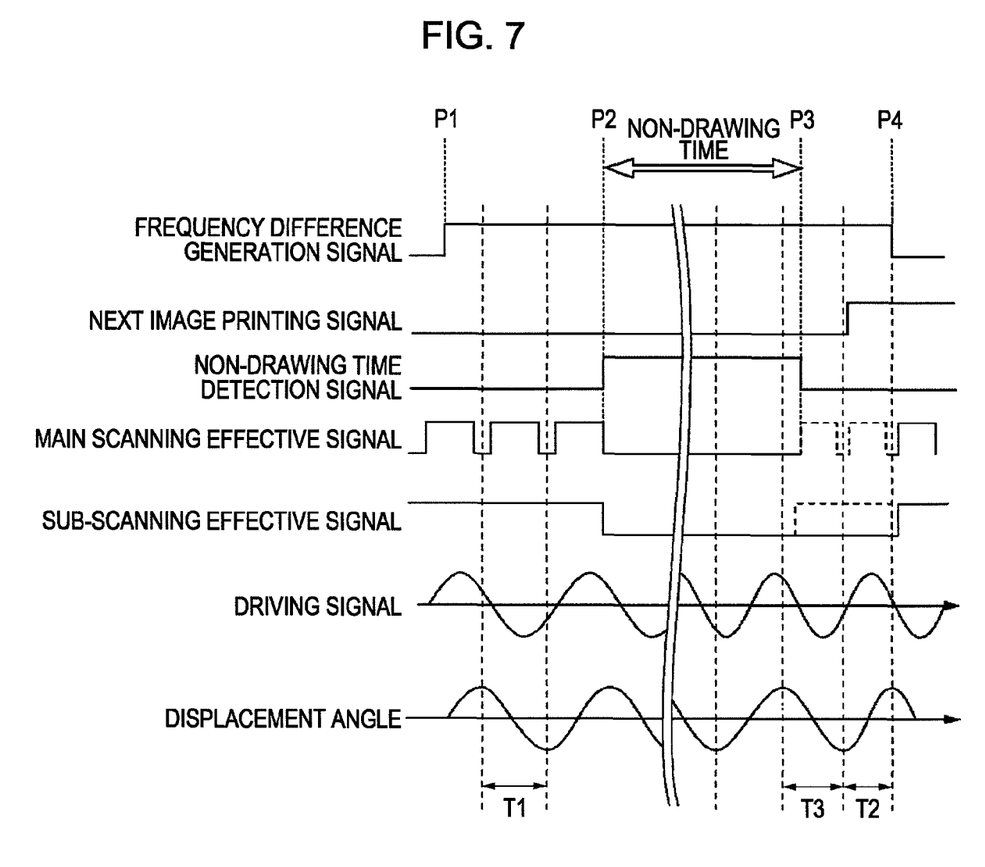
FIG. 7 is a timing chart illustrating a delay of a printing process in the exemplary embodiment of the present invention.

In FIG. 7, the frequency difference generation signal, the non-drawing time detection signal, the main scanning effective signal, the sub-scanning effective signal, the driving signal, and the displacement angle are the same as those in FIG. 5.

When the resonance frequency of the light deflector 10 is changed with a change in temperature, the frequency difference generation signal indicating the generation of the difference between the resonance frequency and the driving frequency is turned on at timing P1 and is output to the driving waveform signal generation unit 18. At the timing P1, because the non-drawing time detection signal is turned off, the driving waveform signal generation unit 18 does not change the driving frequency.

Thereafter, the printing process is advanced and the sub-scanning effective signal is turned off at timing P2. At the timing P2, the non-drawing time detection unit 22 is turned on and the non-drawing time detection signal is output to the driving waveform signal generation unit 18. The timing at which the sub-scanning effective signal is turned off corresponds to, for example, the timing between the preceding sheet and the succeeding sheet as indicated by the non-drawing time 55 in FIG. 4B. The non-drawing time 55 corresponds to a time from the end of a period of time during which the electrostatic latent image for the preceding page is formed on the photosensitive member to a point in time just before the electrostatic latent image for the succeeding page starts to be formed on the photosensitive member.

The driving waveform signal generation unit 18 executes the step of changing the driving frequency after detecting that the frequency difference generation signal is turned on and the frequency changing signal is turned on.

When the driving waveform signal, having been changed, is applied from the driving waveform signal generation unit 18 to the light deflector 10, a certain time is required until the light deflector 10 is properly driven at the changed driving frequency.

As illustrated in FIG. 7, the non-drawing time detection signal is turned off at timing P3. However, the cycle (½ cycle in FIG. 7) of the displacement angle of the light deflector 10 at the timing P3 is T3, differing from the cycle T2 of the displacement angle, which is to be obtained when the light deflector 10 is driven at the target driving frequency. Stated another way, because the target driving frequency is not yet reached, the printing accuracy at a satisfactory level cannot be obtained even when the printing is started in such a state. Therefore, the image forming process has to be stopped.

In that state, the frequency difference measurement unit 17 continuously outputs the frequency difference generation signal to the next image starting signal generation circuit 20. The next image starting signal generation circuit 20 keeps off the next image starting signal until the frequency difference generation signal is turned off. Because the image forming circuit 21 and the light beam generation unit 11 start the printing process when the next image starting signal from the next image starting signal generation circuit 20 is detected, the printing process is not started in the above state.

Thereafter, when the driving frequency of the light deflector 10 reaches the target frequency, i.e., the cycle T2, at timing P4, the frequency difference measurement unit 17 stops outputting of the frequency difference generation signal to the next image starting signal generation circuit 20. At the timing at which the frequency difference generation signal is turned off, the next image starting signal generation circuit 20 outputs the next image starting signal to the image forming circuit 21 and the light beam generation unit 11. Upon receiving the next image starting signal output from the next image starting signal generation circuit 20, the image forming circuit 21 and the light beam generation unit 11 start the printing process.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-070493, filed Mar. 19, 2007 which is hereby incorporated by reference herein in its entirety.

What is claimed is:

1. An image forming apparatus comprising:
   an image forming circuit having an image memory;
   a light beam generation unit arranged to generate a light beam controlled according to image data supplied by said image forming circuit;
   a light deflector arranged to deflect the light beam in a main scanning direction;
   a photosensitive member onto which the deflected light beam is irradiated, said photosensitive member being moved in a sub-scanning direction; and
   a driving control unit configured to drive said light deflector and control said light beam generation unit,
   wherein said driving control unit generates
      a frequency difference generation signal when a difference between a frequency of a driving signal to drive said light deflector and a resonance frequency of said light deflector exceeds a setting value, and
      a non-drawing time detection signal when a non-drawing area whose size exceeds a threshold value is detected in the image memory, and
   wherein, when both the frequency difference generation signal and the non-drawing time detection signal are generated, said driving control unit
      stops operation of said light beam generation unit according to image data, and
      changes the frequency of the driving signal to the resonance frequency of said light deflector.

2. The image forming apparatus according to claim 1, wherein the non-drawing time detection signal is also generated during a time between an end of drawing an electrostatic latent image for a preceding page on said photosensitive member and a start of drawing an electrostatic latent image for a succeeding page on said photosensitive member.

3. The image forming apparatus according to claim 1, wherein the non-drawing area in the image memory corresponds to an area on said photosensitive member in which an electrostatic latent image is not drawn within one page.

4. The image forming apparatus according to claim 1, wherein, after changing the frequency of the driving signal to the resonance frequency of said light deflector, said driving control unit does not cause the operation of said light beam generation unit according to the image data to resume until said light deflector is driven at the resonance frequency.

5. A control method for an image forming apparatus including an image forming circuit, a light beam generation unit arranged to generate a light beam controlled according to image data supplied by the image forming circuit, a light deflector arranged to deflect the light beam in a main scanning direction, and a photosensitive member to which the deflected light beam is irradiated, the photosensitive member being moved in a sub-scanning direction, the method comprising the steps of:
   measuring a difference between a frequency of a driving signal to drive the light deflector and a resonance frequency of the light deflector;
   measuring a size of a non-drawing area in the image memory where an image is not formed by the light deflector; and
   when the difference between the frequency of the driving signal and the resonance frequency of the light deflector exceeds a setting value and when the size of the non-drawing area exceeds a threshold value, stopping operation of the light beam generation unit and changing the frequency of the driving signal to the resonance frequency of the light deflector.

6. The control method for the image forming apparatus according to claim 5, wherein, after changing the frequency of the driving signal to the resonance frequency of the light deflector, delaying the operation of the light beam generation unit according to the image data until the driving frequency of the light deflector reaches the resonance frequency.

* * * * *